United States Patent
Namiki et al.

(10) Patent No.: US 11,518,269 B2
(45) Date of Patent: Dec. 6, 2022

(54) MANAGEMENT APPARATUS, MANAGEMENT METHOD, AND PROGRAM

(71) Applicant: HONDA MOTOR CO., LTD., Tokyo (JP)

(72) Inventors: Shigeru Namiki, Wako (JP); Minoru Uoshima, Wako (JP); Makoto Nishigaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 158 days.

(21) Appl. No.: 16/874,709

(22) Filed: May 15, 2020

(65) Prior Publication Data

US 2020/0384886 A1 Dec. 10, 2020

(30) Foreign Application Priority Data

May 28, 2019 (JP) .............................. JP2019-099399

(51) Int. Cl.
*H02J 7/00* (2006.01)
*B60L 58/14* (2019.01)
(Continued)

(52) U.S. Cl.
CPC .............. *B60L 58/14* (2019.02); *B60L 58/10* (2019.02); *B60L 58/13* (2019.02); *B60L 58/16* (2019.02);
(Continued)

(58) Field of Classification Search
CPC ......... B60L 58/14; B60L 58/10; B60L 58/13; B60L 58/16; B60L 58/22; H02J 3/322; Y02T 90/12; Y02T 90/14
(Continued)

(56) References Cited

U.S. PATENT DOCUMENTS

2005/0137764 A1   6/2005   Alvarez-Troncoso et al.
2010/0134067 A1*  6/2010   Baxter ................ H02J 7/00036
                                              320/109
(Continued)

FOREIGN PATENT DOCUMENTS

JP      2004-364467     12/2004
JP      2008-236902     10/2008
(Continued)

OTHER PUBLICATIONS

Japanese Office Action for Japanese Patent Application No. 2019-099399 dated Apr. 5, 2022.

*Primary Examiner* — Zixuan Zhou
(74) *Attorney, Agent, or Firm* — Amin, Turocy & Watson, LLP

(57) ABSTRACT

A management apparatus includes an acquisition unit configured to acquire battery information regarding a secondary battery mounted on a vehicle and vehicle information regarding traveling of the vehicle from the vehicle, a first identification unit configured to identify a state of the secondary battery by applying the battery information to a battery state identification model for identifying the state of the secondary battery, a second identification unit configured to identify a state of the vehicle by applying the vehicle information to a vehicle state identification model for identifying the state of the vehicle, and a control unit configured to control transmission and reception of electric power between an electric power system and the secondary battery on the basis of the state of the secondary battery identified by the first identification unit and the state of the vehicle identified by the second identification unit.

6 Claims, 5 Drawing Sheets

(51) Int. Cl.
*B60L 58/22* (2019.01)
*B60L 58/16* (2019.01)
*B60L 58/13* (2019.01)
*B60L 58/10* (2019.01)
*G06N 3/02* (2006.01)
*H02J 3/32* (2006.01)

(52) U.S. Cl.
CPC ............... *B60L 58/22* (2019.02); *G06N 3/02* (2013.01); *H02J 3/322* (2020.01); *Y02T 90/12* (2013.01); *Y02T 90/14* (2013.01)

(58) Field of Classification Search
USPC ............................................ 320/109; 701/22
See application file for complete search history.

(56) References Cited

U.S. PATENT DOCUMENTS

| | | | |
|---|---|---|---|
| 2011/0202217 A1* | 8/2011 | Kempton | H02J 3/008 |
| | | | 701/22 |
| 2011/0204720 A1* | 8/2011 | Ruiz | B60L 53/14 |
| | | | 307/66 |
| 2013/0057209 A1* | 3/2013 | Nergaard | H02J 7/0042 |
| | | | 320/109 |
| 2016/0311338 A1* | 10/2016 | Klapper | B60L 53/16 |
| 2017/0144560 A1 | 5/2017 | Park et al. | |
| 2019/0245252 A1* | 8/2019 | Mäki | B60L 3/0069 |

FOREIGN PATENT DOCUMENTS

| | | |
|---|---|---|
| JP | 2011-044346 | 3/2011 |
| JP | 2011-055589 | 3/2011 |
| JP | 2013-104697 | 5/2013 |

\* cited by examiner

FIG. 2

| VEHICLE IDENTIFICATION INFORMATION | BATTERY INFORMATION | VEHICLE INFORMATION | DETERIORATION INFORMATION |
|---|---|---|---|
| XXX1 | (I001, V001, T001) | (SL001, ST001, SS001) | WWW001 |
| XXX2 | (I002, V002, T002) | (SL002, ST002, SS002) | WWW002 |
| XXX3 | (I003, V003, T003) | (SL003, ST003, SS003) | WWW003 |
| ... | ... | ... | ... |

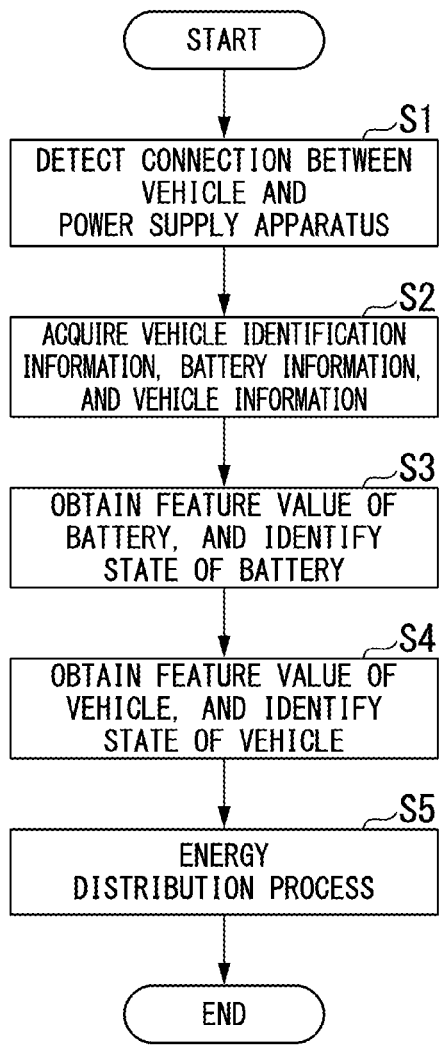

MANAGEMENT APPARATUS, MANAGEMENT METHOD, AND PROGRAM

CROSS-REFERENCE TO RELATED APPLICATION

Priority is claimed on Japanese Patent Application No. 2019-099399, filed May 28, 2019, the content of which is incorporated herein by reference.

BACKGROUND OF THE INVENTION

Field of the Invention

The present invention relates to a management apparatus, a management method, and a program.

Description of Related Art

In recent years, electric vehicles have come to be widely used. Electric vehicles are mounted with a battery (for example, a secondary battery), accumulate electricity in the secondary battery, and travel by supplying electric power to a motor from the secondary battery during traveling. Thus, a user of an electric vehicle accumulates electricity in the secondary battery of the electric vehicle, for example, at a charging station provided at various locations or at a home of the user.

A social system called vehicle to grid (V2G) has been proposed. In the V2G system, electric power is interchanged between an electric power system including a commercial electric power network and electric vehicles. In the V2G, when an electric vehicle is not used as moving means, a secondary battery mounted on the electric vehicle is used like one of electric power storage facilities in a commercial electric power network. Thus, electric power is transmitted and received in a bidirectional manner between an electric vehicle and an electric power system that participate in the V2G. In the V2G system, for example, a management apparatus manages transmission and reception of electric power between a secondary battery mounted on a vehicle and accumulating electric power for traveling and an electric power system (for example, refer to Japanese Unexamined Patent Application, First Publication No. 2004-364467).

SUMMARY OF THE INVENTION

However, in the related art, in a case of managing transmission and reception of electric power between the secondary battery mounted on a vehicle and accumulating electric power for traveling and the electric power system, a state of the secondary battery of the vehicle is not taken into consideration.

Aspects of the present invention have been made in consideration of these circumstances, and an object thereof is to provide a management apparatus, a management method, and a program capable of performing operations of transmission and reception of electric power by taking into consideration a state of a secondary battery of a vehicle.

In order to solve the problem and to achieve the object, the present invention employs the following aspects.

(1): According to an aspect of the present invention, there is provided a management apparatus including an acquisition unit configured to acquire battery information regarding a secondary battery mounted on a vehicle and vehicle information regarding traveling of the vehicle from the vehicle; a first identification unit configured to identify a state of the secondary battery by applying the battery information to a battery state identification model for identifying the state of the secondary battery; a second identification unit configured to identify a state of the vehicle by applying the vehicle information to a vehicle state identification model for identifying the state of the vehicle; and a control unit configured to control transmission and reception of electric power between an electric power system and the secondary battery on the basis of the state of the secondary battery identified by the first identification unit and the state of the vehicle identified by the second identification unit.

(2): In the aspect of the above (1), the first identification unit may identify the state of the secondary battery by also applying time-series changes of the battery information to the battery state identification model.

(3): In the aspect of the above (1) or (2), the first identification unit may calculate deterioration information regarding deterioration in the secondary battery on the basis of the battery information, and identify the state of the secondary battery by also applying the calculated deterioration information to the battery state identification model.

(4): In the aspect of any one of the above (1) to (3), the control unit may acquire information for controlling transmission and reception of electric power between the electric power system and the secondary battery by inputting the state of the secondary battery identified by the first identification unit and the state of the vehicle identified by the second identification unit to an energy distribution model for distributing energy.

(5): According to another aspect of the present invention, there is provided a management method of causing a management apparatus managing transmission and reception of electric power between an electric power system and a secondary battery mounted on a vehicle to acquire battery information regarding the secondary battery and vehicle information regarding traveling of the vehicle from the vehicle; identify a state of the secondary battery by applying the battery information to a battery state identification model for identifying the state of the secondary battery; identify a state of the vehicle by applying the vehicle information to a vehicle state identification model for identifying the state of the vehicle; and control transmission and reception of electric power between the electric power system and the secondary battery on the basis of the identified state of the secondary battery and the identified state of the vehicle.

(6): According to still another aspect of the present invention, there is provided a computer readable non-transitory storage medium storing a program causing a computer of a management apparatus managing transmission and reception of electric power between an electric power system and a secondary battery mounted on a vehicle to acquire battery information regarding the secondary battery and vehicle information regarding traveling of the vehicle from the vehicle; identify a state of the secondary battery by applying the battery information to a battery state identification model for identifying the state of the secondary battery; identify a state of the vehicle by applying the vehicle information to a vehicle state identification model for identifying the state of the vehicle; and control transmission and reception of electric power between the electric power system and the secondary battery on the basis of the identified state of the secondary battery and the identified state of the vehicle.

According to the aspects of the above (1) to (6), a state of the secondary battery and a state of the vehicle are identified by using the battery information and the vehicle information from the vehicle, and energy is distributed on the basis of a secondary battery identification result and a vehicle identification result. Thus, it is possible to perform operations of transmission and reception of electric power by taking into consideration a state of the secondary battery of the vehicle or a state of the vehicle.

According to the aspect of the above (2), a state of the secondary battery is identified by also using the time-series change information regarding the secondary battery, and thus it is possible to perform energy distribution with higher accuracy according to a change in a state of the secondary battery.

According to the aspect of the above (3), a state of the secondary battery is identified by also using the deterioration information regarding the secondary battery, and thus it is possible to perform energy distribution with higher accuracy according to a deterioration state of the secondary battery.

According to the aspect of the above (4), energy distribution is performed by inputting the secondary battery identification result and the vehicle identification result to the model, and thus it is possible to perform operations of transmission and reception of electric power by taking into consideration a state of the secondary battery of the vehicle or a state of the vehicle.

BRIEF DESCRIPTION OF THE DRAWINGS

FIG. 2 is a diagram illustrating an example of information stored in a storage unit of the management apparatus according to the embodiment.

FIG. 6 is a flowchart illustrating a process performed by the electric power operation system according to the embodiment.

DETAILED DESCRIPTION OF THE INVENTION

Hereinafter, with reference to the drawings, a management apparatus, a management method, and a program according to an embodiment of the present invention will be described. In the following description, a vehicle is assumed to be an electric vehicle mounted with a secondary battery or an electric vehicle in which a secondary battery is replaceable. However, the vehicle may be a hybrid vehicle or a fuel cell vehicle as long as the vehicle can accumulate electric power from the outside and is mounted with a secondary battery supplying electric power for traveling. The vehicle may be a four-wheeled vehicle, a three-wheeled vehicle, a saddle-riding type vehicle, a motor-assisted bicycle, a tiller, a management machine, a walking assist apparatus, and a kickboard, mounted with a secondary battery or in which a secondary battery is replaceable.

Outlines of V2G System and V2H System

First, a description will be made of an outline of a vehicle to grid (V2G) system. The V2G system is a system that interchanges electric power between an electric power system including a commercial electric power network and a vehicle. In the V2G system, when a vehicle is not used as moving means, a secondary battery mounted on the vehicle is used as an electric power storage facility. Thus, electric power is transmitted and received in a bidirectional manner between the vehicle and the electric power system participating in the V2G.

Next, a description will be made of an outline of a vehicle to home (V2H) system. The V2H system is a system that interchanges electric power between a house or the like and a vehicle. In the V2H system, electric power accumulated in a secondary battery mounted on the vehicle is supplied to the house to be used therein.

Overall Configuration

Figure 1:
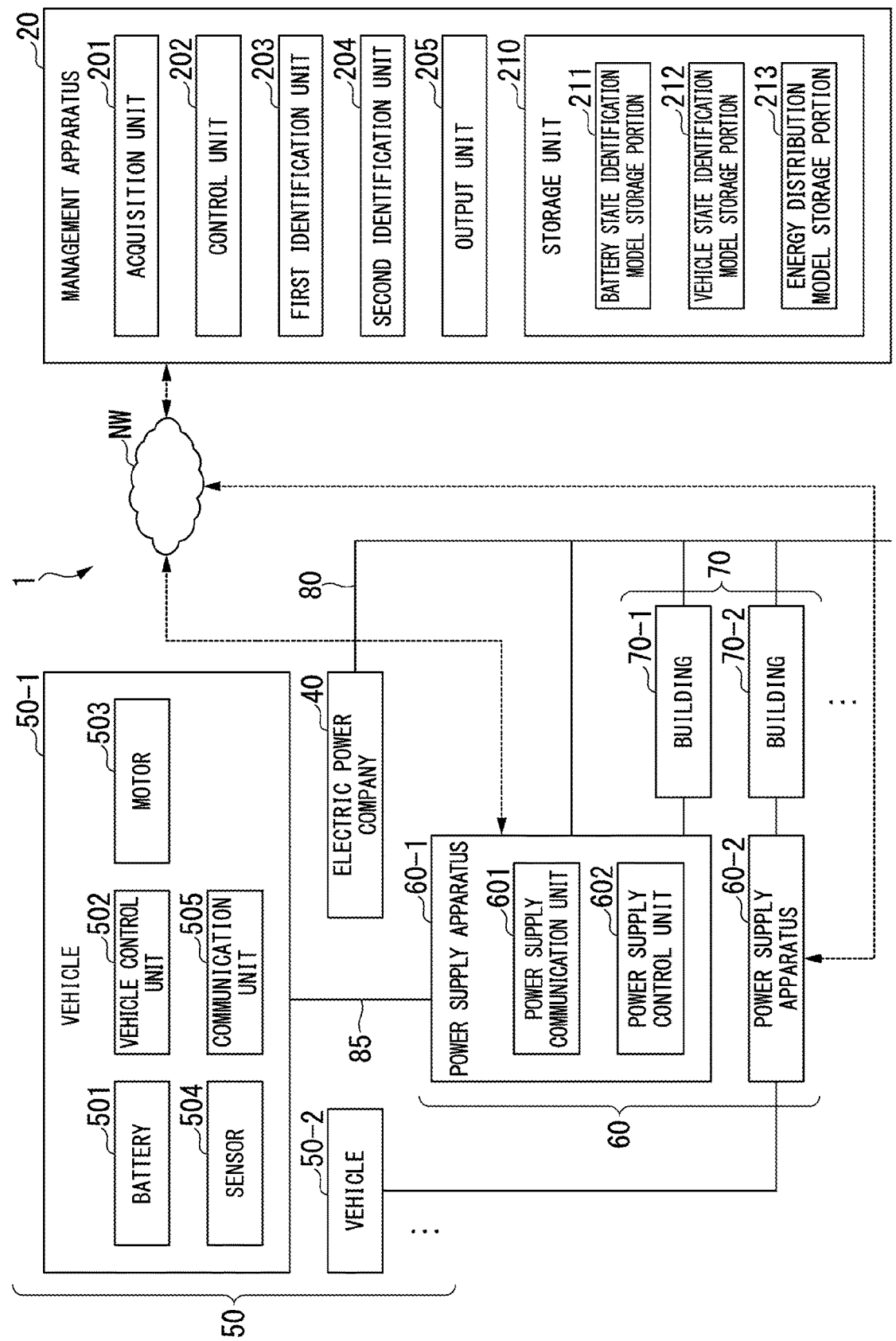
FIG. 1 is a diagram illustrating examples of a configuration and a usage environment of an electric power operation system including a management apparatus according to an embodiment.

FIG. 1 is a diagram illustrating examples of a configuration and a usage environment of an electric power operation system 1 including a management apparatus 20 according to the present embodiment. As illustrated in FIG. 1, the electric power operation system 1 includes the management apparatus 20, an electric power company 40, at least one vehicle 50 (50-1, 50-2, . . . ), at least one power supply apparatus 60 (60-1, 60-2, . . . ), and at least one building 70 (70-1, 70-2, . . . ). In the following description, in a case where one of the vehicles 50-1, 50-2, . . . is not specified, the vehicles will be simply referred to as the vehicle 50. In a case where one of the power supply apparatuses 60-1, 60-2, . . . is not specified, the power supply apparatuses will be simply referred to as the power supply apparatus 60. In a case where one of the buildings 70-1, 70-2, . . . is not specified, the buildings will be simply referred to as the building 70.

With reference to FIG. 1, a description will be made of a usage environment example of the electric power operation system 1. For example, the power supply apparatus 60 is provided in the building 70-1 (for example, a home of a user, a company where the user works, a lodging used by the user, or a charging station) used by the user of the vehicle 50. The user connects the vehicle 50 to the power supply apparatus 60, for example, when returning home. The management apparatus 20 controls electric power to be supplied to the vehicle 50 via the power supply apparatus 60, and controls electric power to be interchanged between an electric power system including a commercial electric power network and the vehicle 50. The management apparatus 20 controls electric power to be supplied to the vehicle 50 via the power supply apparatus 60, and controls electric power to be interchanged between the building 70 and the vehicle 50. The power supply apparatus 60 and the electric power company 40 are connected to each other via a power transmission line 80. The management apparatus 20 and the power supply apparatus 60 are connected to each other via a network NW. The vehicle 50 and the power supply apparatus 60 are connected to each other via a cable 85. The cable 85 is a power supply cable, and may be provided with a signal line. The cable 85 may be provided with at least a plug connected to the vehicle 50. Alternatively, in the cable 85, a signal may be superimposed on the power supply cable. The network NW includes, for example, the Internet, a wide area network (WAN), a local area network (LAN), a provider apparatus, and a radio base station.

Electric Power Company 40

The electric power company 40 includes a power plant that generates power by using energy such as thermal power, wind power, nuclear power, or solar light, and supplies electric power to an assigned area, for example. The area here may be defined in any way. The area may be defined, for example, in the unit of administrative divisions such as prefectures and municipalities, or may be defined in the unit of jurisdiction of substations. The electric power company 40 transmits an instruction for charging and discharging a battery 501 mounted on the vehicle 50 to the management apparatus 20 via the network NW according to electric power demand. The example illustrated in FIG. 1 is an example of the single area and is an example of the single electric power company 40.

Management Apparatus 20

The management apparatus 20 includes an acquisition unit 201, a control unit 202, a first identification unit 203, a second identification unit 204, an output unit 205, and a storage unit 210. The storage unit 210 includes a battery state identification model storage portion 211, a vehicle state identification model storage portion 212, and an energy distribution model storage portion 213. The storage unit 210 may be connected to the management apparatus 20 via the network NW.

The management apparatus 20 performs communication with the electric power company 40 via the network NW. The management apparatus 20 performs communication with a plurality of power supply apparatuses 60 via the network NW. The management apparatus 20 manages electric power on the basis of information transmitted from the electric power company 40. The management apparatus 20 manages charging and discharging of the battery 501 of the vehicle 50 connected to the power supply apparatus 60 on the basis of vehicle identification information for identifying the vehicle 50, battery information, and vehicle information, acquired from the vehicle 50, and thus charges the battery 501 or supplies electric power to the electric power system from the vehicle 50. The battery information and the vehicle information will be described later.

The acquisition unit 201 receives a request from the electric power company 40 via the network NW. The request received from the electric power company 40 is, for example, a request for supplying electric power to the electric power system or a request for stopping the supply of electric power to the electric power system. The acquisition unit 201 outputs the acquired request to the control unit 202. The acquisition unit 201 acquires the vehicle identification information, the battery information, and the vehicle information from the power supply apparatus 60 via the network NW. The acquisition unit 201 outputs the acquired vehicle identification information, battery information, and vehicle information to the control unit 202.

The control unit 202 acquires the vehicle identification information, the battery information, and the vehicle information output from the acquisition unit 201, and stores the acquired vehicle identification information, battery information, and vehicle information in the storage unit 210. The control unit 202 inputs a battery identification result output from the first identification unit 203 and a vehicle identification result output from the second identification unit 204 to an energy distribution model stored in the energy distribution model storage portion 213, and thus generates a control instruction for controlling transmission and reception of electric power with the electric power system for each target vehicle 50. In a case where there are a plurality of vehicles 50, the control unit 202 inputs a battery identification result and a vehicle identification result of each of the plurality of vehicles 50 to the energy distribution model, and thus generates a control instruction for controlling transmission and reception of electric power with the electric power system for each vehicle 50. The control unit 202 adds vehicle identification information to the generated control instruction that is then output to the output unit 205 such that the control instruction is transmitted to each target vehicle 50. The control unit 202 generates the control instruction such that electric power is supplied to the electric power system in response to the request acquired from the electric power company 40, output from the acquisition unit 201.

The first identification unit 203 inputs the battery information stored in the storage unit 210 to a battery state identification model stored in the battery state identification model storage portion 211, and thus obtains a feature value of the battery. The feature value of the battery will be described later. The first identification unit 203 identifies a state of the battery on the basis of the obtained feature value of the battery, and outputs the identified state of the battery (battery identification result) to the control unit 202.

The second identification unit 204 inputs the vehicle information stored in the storage unit 210 to a vehicle state identification model stored in the vehicle state identification model storage portion 212, and thus extracts a feature value of the vehicle. The feature value of the vehicle will be described later. The second identification unit 204 identifies a state of the vehicle on the basis of the obtained feature value of the vehicle, and outputs the identified state of the vehicle (vehicle identification result) to the control unit 202.

The output unit 205 transmits the control instruction added with the vehicle identification information, output from the control unit 202, to the power supply apparatus 60 connected to the vehicle corresponding to the vehicle identification information via the network NW.

The storage unit 210 stores the vehicle identification information in association with the battery information, the vehicle information, and deterioration information regarding the battery 501.

The battery state identification model storage portion 211 stores the battery state identification model used to obtain a feature value of the battery. The battery state identification model is created through machine learning by using a model such as a neural network, and training data.

The vehicle state identification model storage portion 212 stores the vehicle state identification model used to obtain a feature value of the vehicle. The vehicle state identification model is created through machine learning by using a model such as a neural network, and training data.

The energy distribution model storage portion 213 stores the energy distribution model used to distribute energy. The energy distribution model is created through machine learning by using a model such as a neural network, and training data.

Power Supply Apparatus 60

The power supply apparatus 60 includes a power supply communication unit 601 and a power supply control unit 602.

The power supply apparatus 60 performs communication with the management apparatus 20 via the network NW. The power supply apparatus 60 is connected to the power transmission line 80. The power supply apparatus 60 is connected to the vehicle 50 via the cable 85. The power supply apparatus 60 acquires the vehicle identification information, the battery information, and the vehicle information output from the vehicle 50, via the cable 85. The power supply apparatus 60 transmits the acquired vehicle identification information, battery information, and vehicle information to the management apparatus 20 via the network NW. The power supply apparatus 60 controls charging of the battery 501 mounted on the vehicle 50 with electric power from the electric power system and controls supplying of electric power accumulated in the battery 501 to the electric power system, on the basis of the control instruction received from the management apparatus 20.

The power supply communication unit 601 receives the control instruction transmitted from the management apparatus 20 via the network NW, and outputs the received control instruction to the power supply control unit 602. The power supply communication unit 601 acquires the vehicle identification information, the battery information, and the vehicle information output from the vehicle 50, and outputs the acquired vehicle identification information, battery information, and vehicle information to the power supply control unit 602. The power supply communication unit 601 transmits the vehicle identification information, the battery information, and the vehicle information output from the power supply control unit 602 to the management apparatus 20 via the network NW.

The power supply control unit 602 acquires the vehicle identification information, the battery information, and the vehicle information output from the power supply communication unit 601, and outputs the acquired vehicle identification information, battery information, and vehicle information to the power supply communication unit 601 such that the vehicle identification information, the battery information, and the vehicle information are transmitted to the management apparatus 20. The power supply control unit 602 acquires the control instruction output from the power supply communication unit 601. The power supply control unit 602 controls charging of the battery 501 mounted on the vehicle 50 with electric power from the electric power system and controls supplying of electric power accumulated in the battery 501 to the electric power system, on the basis of the acquired control instruction. The power supply control unit 602 detects that the vehicle 50 is connected to the power supply apparatus 60 via the cable 85 on the basis of, for example, a change in a voltage of the cable 85.

Vehicle 50

The vehicle 50 includes the battery 501 (secondary battery), a vehicle control unit 502, a motor 503, a sensor 504, and a communication unit 505. Although not illustrated, the vehicle 50 includes an inverter, a transmission, wheels, and the like.

The battery 501 is a secondary battery such as a lithium ion battery. The battery 501 accumulates electric power, and releases the accumulated electric power, under the control of the vehicle control unit 502.

The vehicle control unit 502 acquires detection values (a current value, a voltage value, a temperature, and a rotation speed) output from the sensor 504. The vehicle control unit 502 extracts, for example, the current value, the voltage value, and the temperature among the acquired detection values, and adds the vehicle identification information to the extracted current value, voltage value, and temperature that are then output to the communication unit 505. The vehicle control unit 502 stores the vehicle identification information. The vehicle control unit 502 controls the battery 501 to be charged with electric power under the control of the power supply apparatus 60. Alternatively, the vehicle control unit 502 controls electric power accumulated in the battery 501 to be output to the power supply apparatus 60 under the control of the power supply apparatus 60.

The motor 503 rotates the wheels by using electric power supplied from the battery 501 under the control of the vehicle control unit 502.

The sensor 504 includes, for example, a current sensor detecting a current flowing through the battery 501, a voltage sensor detecting a voltage of the battery 501, a temperature sensor detecting an ambient temperature of the battery 501, and a rotation detection sensor detecting a rotation speed of the motor 503. The sensor 504 outputs a detection value that has been detected to the vehicle control unit 502.

In a case where the vehicle 50 is connected to the power supply apparatus 60 via the cable 85, the communication unit 505 outputs the vehicle identification information, the battery information, and the vehicle information output from the vehicle control unit 502 to the power supply apparatus 60 via the cable 85.

Building 70

The building 70 is, for example, a home of a user, a company where the user works, a lodging used by the user, or a charging station. The building 70 is provided with, for example, a household appliance and a lighting apparatus. The building 70 is supplied with electric power from the electric power system, or is supplied with electric power from the vehicle 50 via the power supply apparatus 60. Switching therebetween is performed by, for example, the power supply apparatus 60.

Constituent elements such as the control unit 202, the first identification unit 203, and the second identification unit 204 of the management apparatus 20 are realized by a hardware processor such as a central processing unit (CPU) executing a program (software). Alternatively, the power supply control unit 602 of the power supply apparatus 60 is realized by a hardware processor such as a CPU executing a program (software). Alternatively, the vehicle control unit 502 of the vehicle 50 is realized by a hardware processor such as an electronic control unit (ECU) or a CPU executing a program (software). Some or all of the control unit 202, the power supply control unit 602, and the vehicle control unit 502 may be realized by hardware (a circuit portion; including a circuitry) such as a large scale integration (LSI), an application specific integrated circuit (ASIC), a field-programmable gate array (FPGA), or a graphics processing unit (GPU), and may be realized in cooperation between software and hardware. The program may be stored in advance in a storage device (a storage device provided with a non-transitory storage medium) such as a hard disk drive (HDD) or a flash memory, and may be stored in an attachable and detachable storage medium (non-transitory storage medium) such as a DVD or a CD-ROM and may be installed when the storage medium is attached to a drive device.

Information Stored in Storage Unit 210 of Management Apparatus 20

Next, a description will be made of an example of information stored in the storage unit 210 of the management apparatus 20. FIG. 2 is a diagram illustrating an example of information stored in the storage unit 210 of the management apparatus 20 according to the present embodiment. As illustrated in FIG. 2, the storage unit 210 stores vehicle identification information in association with battery information, vehicle information, and deterioration information. The battery information includes, for example, a current value (I), a voltage value (V), and a temperature (T). The vehicle information includes, for example, a traveling distance (SL), a traveling time (ST), and an average speed (SS).

Figure 3:
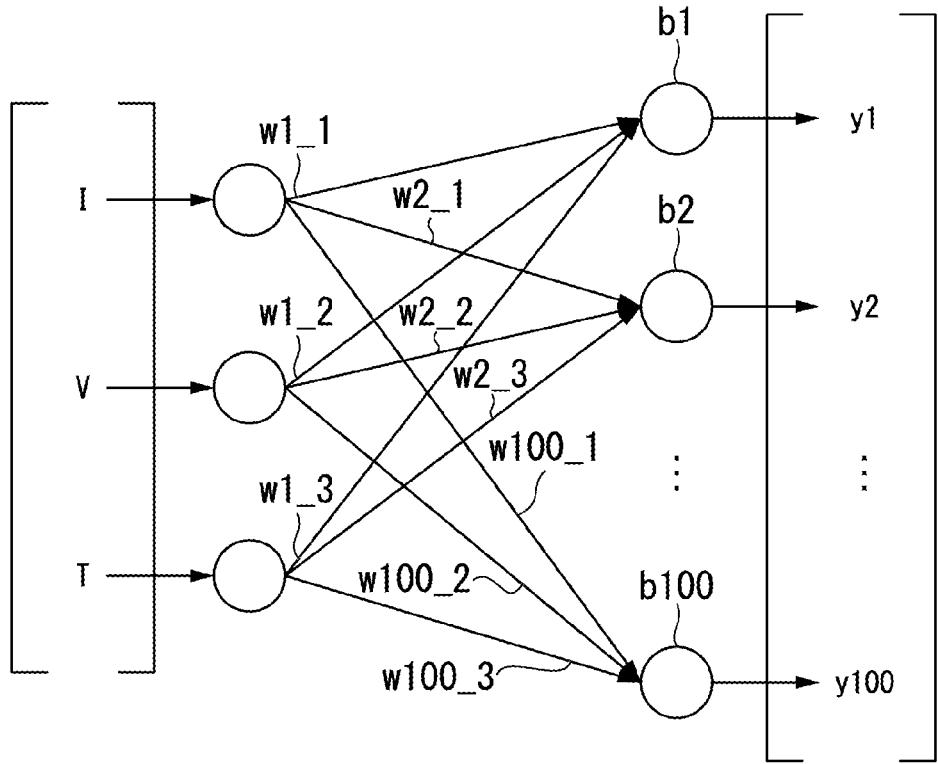
FIG. 3 is a diagram illustrating an example of a battery state identification model stored in a battery state identification model storage portion according to the embodiment.

Examples of Battery State Identification Model, Battery Feature Value, and Identification of Battery State Next, a description will be made of an example of the battery state identification model stored in the battery state identification model storage portion 211. FIG. 3 is a diagram illustrating an example of the battery state identification model stored in the battery state identification model storage portion 211 according to the present embodiment. The battery state identification model in the example illustrated in FIG. 3 is a model having the current value (I), the voltage value (V), and the temperature (T) as inputs, and is used to obtain feature values (y1, y2, . . . , y100). The number of intermediate layers, weighting factors, and the number of feature values illustrated in FIG. 3 are only examples, and are not limited thereto. The number of inputs of the model is not limited thereto, and two or more of a current value, a voltage value, and a temperature may be input. As will be described later, time-series change information regarding the battery 501 or deterioration information regarding the battery 501 may be further input to the model. The vehicle information input to the model is not limited to a current value, a voltage value, and a temperature, and may be, for example, a state of charge (SOC) calculated by using the current value and the voltage value, or a resistance value of the battery 501 calculated by using the current value and the voltage value.

The first identification unit 203 represents the feature value of the battery obtained by using the battery state identification model, for example, in a radar chart, and identifies a state of the battery as two or more states by classifying a shape of the radar chart. The first identification unit 203 may represent the feature value in a contour line graph such that a state of the battery may be identified.

Figure 4:
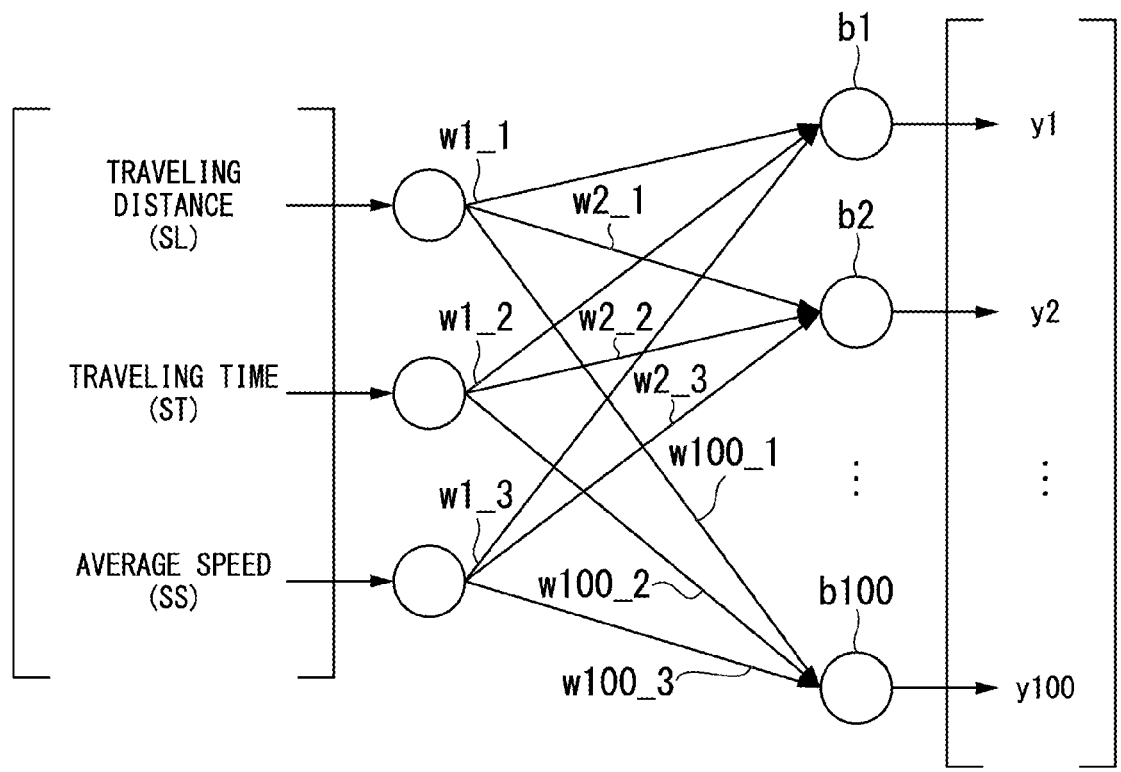
FIG. 4 is a diagram illustrating an example of a vehicle state identification model stored in a vehicle state identification model storage portion according to the embodiment.

Examples of Vehicle State Identification Model, Vehicle Feature Value, and Identification of Vehicle State Next, a description will be made of an example of the vehicle state identification model stored in the vehicle state identification model storage portion 212. FIG. 4 is a diagram illustrating an example of the vehicle state identification model stored in the vehicle state identification model storage portion 212 according to the present embodiment. The vehicle state identification model in the example illustrated in FIG. 4 is a model having the traveling distance (SL), the traveling time (ST), and the average speed (SS) as inputs, and is used to obtain feature values (y1, y2, . . . , y100). The traveling distance is, for example, an integrated traveling distance from the start of the use of the vehicle 50. The traveling time is, for example, an integrated traveling time from the start of the use of the vehicle 50. The average speed is, for example, a value obtained by dividing an integrated traveling speed from the start of the use of the vehicle 50 by an integrated traveling time. The number of intermediate layers, weighting factors, and the number of feature values illustrated in FIG. 4 are only examples, and are not limited thereto. The number of inputs of the model is not limited thereto, and two or more of a traveling distance, a traveling time, and a speed may be input.

The second identification unit 204 represents the feature value obtained by using the vehicle state identification model, for example, in a radar chart, and identifies a state of the vehicle as two or more states by classifying a shape of the radar chart. The second identification unit 204 may represent the feature value in a contour line graph such that a state of the vehicle may be identified.

Energy Distribution Model Example

Figure 5:
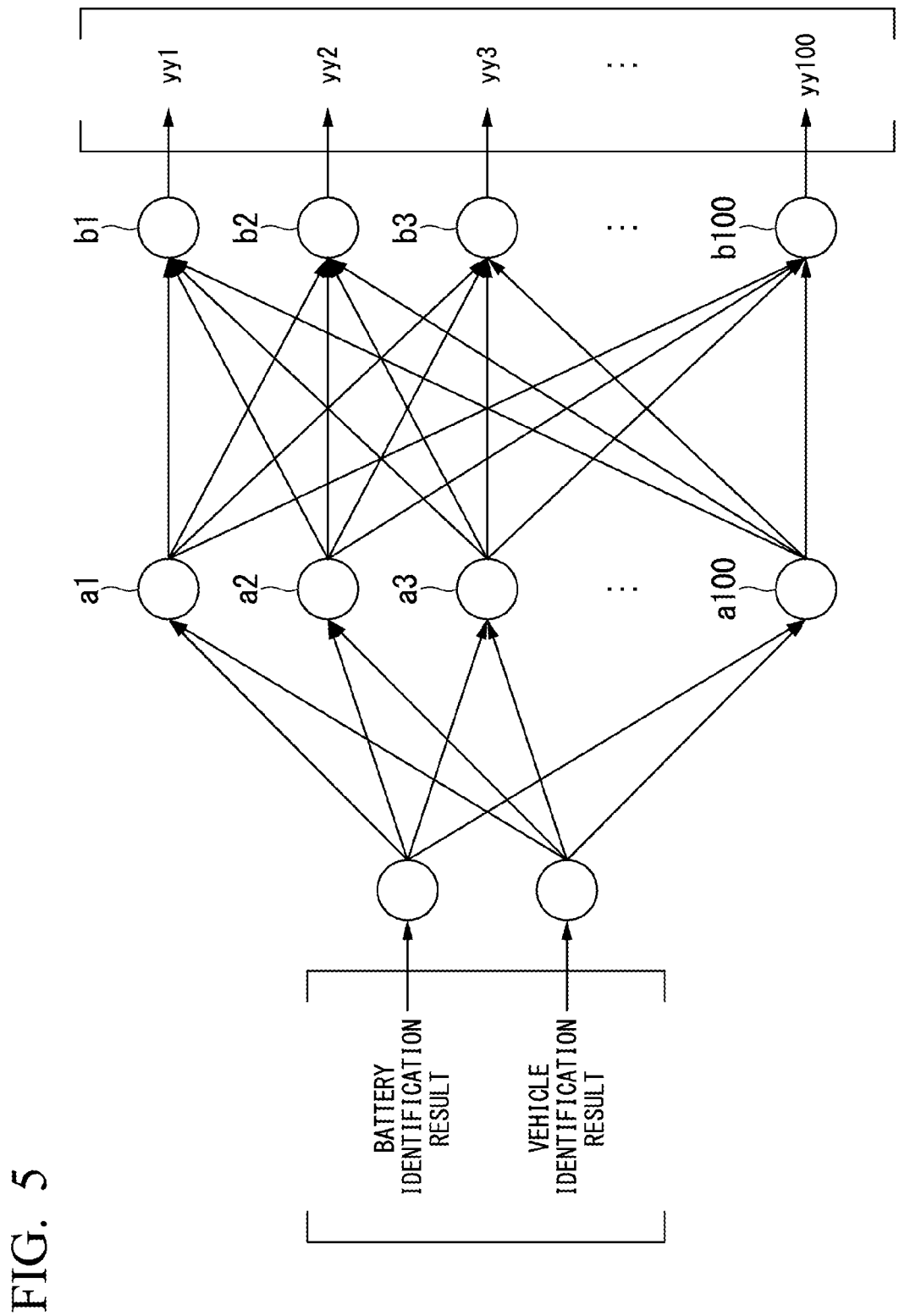
FIG. 5 is a diagram illustrating an example of an energy distribution model stored in an energy distribution model storage portion according to the embodiment.

Next, a description will be made of an example of the energy distribution model stored in the energy distribution model storage portion 213. FIG. 5 is a diagram illustrating an example of the energy distribution model stored in the energy distribution model storage portion 213 according to the present embodiment. The energy distribution model in the example illustrated in FIG. 5 is a model having the battery identification result and the vehicle identification result as inputs, and is used to obtain control instructions (yy1, yy2, . . . , yy100). The number of intermediate layers, weighting factors, and the number of control instructions illustrated in FIG. 5 are only examples, and are not limited thereto. In the example illustrated in FIG. 5, a description has been made of an example in which the battery identification result and the vehicle identification result are input to the energy distribution model, but this is only an example. Inputs of the model may be a feature value of the battery and a feature value of the vehicle.

An output of the energy distribution model may be a feature value. In this case, the control unit 202 may represent a feature value obtained by using the energy distribution model, for example, in a radar chart, and may identify a control instruction as two or more states by classifying a shape of the radar chart.

Processing Procedure Example in Electric Power Operation System

Next, a description will be made of an example of a processing procedure performed by the electric power operation system 1. FIG. 6 is a flowchart illustrating a process performed by the electric power operation system 1 according to the present embodiment.

The power supply control unit 602 of the power supply apparatus 60 detects that the vehicle 50 is connected thereto via the cable (step S1).

The power supply control unit 602 of the power supply apparatus 60 acquires vehicle identification information, battery information, and vehicle information via the cable 85 and the power supply communication unit 601. Next, the power supply control unit 602 transmits the vehicle identification information, the battery information, and the vehicle information to the management apparatus 20 via the network NW. Next, the control unit 202 of the management apparatus 20 acquires the vehicle identification information, the battery information, and the vehicle information transmitted from the power supply apparatus 60 via the network NW and the acquisition unit 201 (step S2).

The first identification unit 203 of the management apparatus 20 inputs, for example, a current value, a voltage value, and a temperature included in the acquired battery information to the battery state identification model, and thus obtains a feature value of the battery. Next, the first identification unit 203 represents the feature value of the battery, for example, in a radar chart, and identifies a state of the battery as two or more states by classifying a shape of the radar chart (step S3).

The second identification unit 204 of the management apparatus 20 inputs, for example, a traveling distance, a traveling time, and an average speed included in the acquired vehicle information to the vehicle state identification model, and thus obtains a feature value of the vehicle. Next, the second identification unit 204 represents the feature value of the battery, for example, in a radar chart, and identifies a state of the vehicle as two or more states by classifying a shape of the radar chart (step S4).

The control unit 202 of the management apparatus 20 inputs the battery identification result and the vehicle identification result to the energy distribution model, and thus obtains a control instruction. Next, the control unit 202 transmits the obtained control instruction to the power supply apparatus 60 via the network NW, and thus performs an energy distribution process (step S5).

Here, an example of energy distribution using FIG. 6 will be described with reference to FIG. 1. In order to simplify description, a description will be made of a case where there are two vehicles 50 and two power supply apparatuses 60. In this example, a first vehicle 50-1 is connected to a first power supply apparatus 60-1, and a second vehicle 50-2 is connected to a second power supply apparatus 60-2. First, the management apparatus 20 acquires vehicle identification information, battery information, and vehicle information from the first vehicle 50-1, and acquires vehicle identification information, battery information, and vehicle information from the second vehicle 50-2. Next, the management apparatus 20 obtains a battery identification result and a vehicle identification result for the first vehicle 50-1, and obtains a battery identification result and a vehicle identification result for the second vehicle 50-2. For example, in a case where the second vehicle 50-2 has a longer traveling time and a longer traveling distance than those of the first vehicle 50-1, electric power of the second vehicle 50-2 is to be prioritized to that of the first vehicle 50-1. In this case, the control unit 202 generates a control instruction on the basis of the energy distribution model such that electric power is not supplied from the battery 501 of the second vehicle 50-2 to the electric power system, and electric power is supplied from the battery 501 of the first vehicle 50-1 to the electric power system.

As mentioned above, in the present embodiment, a state of the battery 501 is identified, a state of the vehicle is identified, and identification results are input to the energy distribution model, so that a control instruction for controlling transmission and reception of electric power between the electric power system and the secondary battery is generated.

Consequently, in the present embodiment, it is possible to perform operations of transmission and reception of electric power by taking into consideration a state of the secondary battery of the vehicle according to a state of the battery or a state of the vehicle. As a result, according to the present embodiment, it is possible to perform optimal energy management.

First Modification Example

In the above-described example, a description has been made of an example of obtaining a feature value of the battery by using a current value, a voltage value, and a temperature. The battery 501 is subjected to deterioration due to a conduction time period, the number of times of charging, and the number of times of discharging. Thus, the first identification unit 203 may obtain a feature value of the battery by also inputting time-series changes of the battery 501 to the battery state identification model in addition to a current value, a voltage value, and a temperature as the battery information. Here, the time-series changes of the battery 501 are, for example, time-series changes (for example, every month or every week) in an SOC. Also in this case, an input of the model may be at least one of a current value, a voltage value, a temperature, or time-series changes of the battery 501. As mentioned above, the time-series changes of the battery 501 are also input to the model, and thus it is possible to identify a state of the battery with higher accuracy. As a result, according to the first modification example, it is possible to perform energy distribution with higher efficiency by using a result of identifying a state of the battery.

Second Modification Example

In the first modification example, although a description has been made of an example in which time-series changes of the battery 501 are also input to the battery state identification model in addition to a current value, a voltage value, and a temperature, this is only an example. The first identification unit 203 may obtain a feature value of the battery by also inputting deterioration information regarding the battery 501 to the battery state identification model in addition to a current value, a voltage value, and a temperature as the battery information. The battery deterioration information is a value such as a ratio of the current full charge state to an initial full charge state. The initial full charge state may be included in the battery information to be transmitted by the vehicle 50, and may be stored in the storage unit 210 of the management apparatus 20. As mentioned above, the deterioration information regarding the battery 501 is also input to the model, and thus it is possible to identify a state of the battery with higher accuracy. As a result, according to the second modification example, it is possible to perform energy distribution with higher efficiency by using a result of identifying a state of the battery. In this case, a control instruction is generated on the basis of the energy distribution model such that the supply of electric power to the electric power system from the battery 501 that has deteriorated less is prioritized to the supply of electric power to the electric power system from the battery 501 that has deteriorated. The first identification unit 203 may obtain a feature value of the battery by using remaining performance of the battery 501 obtained by subtracting a deterioration state from an initial state instead of the deterioration information regarding the battery 501.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A management apparatus comprising:
an acquisition unit configured to acquire battery information regarding a secondary battery mounted on a vehicle and vehicle information regarding traveling of the vehicle from the vehicle, the battery information including two or more of a current value, a voltage value, and a temperature and the vehicle information including two or more of a traveling distance, a traveling time, and a speed;
a storage unit configured to store at least a battery state identification model generated through machine learning of the battery information by using a neural network and training data and a vehicle state identification model generated through machine learning of the vehicle information by using a neural network and training data;
a first identification unit configured to identify a state of the secondary battery by applying the battery information to the battery state identification model for identifying the state of the secondary battery;
a second identification unit configured to identify a state of the vehicle by applying the vehicle information to the vehicle state identification model for identifying the state of the vehicle; and
a control unit configured to control transmission and reception of electric power between an electric power system and the secondary battery on the basis of the state of the secondary battery identified by the first identification unit and the state of the vehicle identified by the second identification unit.

2. The management apparatus according to claim 1,
wherein the first identification unit identifies the state of the secondary battery by also applying time-series changes of the battery information to the battery state identification model.

3. The management apparatus according to claim 1,
wherein the first identification unit
calculates deterioration information regarding deterioration in the secondary battery on the basis of the battery information, and
identifies the state of the secondary battery by also applying the calculated deterioration information to the battery state identification model.

4. The management apparatus according to claim 1,
wherein the storage unit further stores an energy distribution model for distributing energy, which energy distribution model is generated through machine learning of at least the state of the secondary battery identified by the first identification unit and the state of the vehicle identified by the second identification unit by using a neural network and training data, and
wherein the control unit acquires information for controlling transmission and reception of electric power between the electric power system and the secondary battery by inputting the state of the secondary battery identified by the first identification unit and the state of the vehicle identified by the second identification unit to the energy distribution model for distributing energy.

5. A management method of causing a management apparatus managing transmission and reception of electric power between an electric power system and a secondary battery mounted on a vehicle to:
acquire battery information regarding the secondary battery and vehicle information regarding traveling of the vehicle from the vehicle, the battery information including two or more of a current value, a voltage value, and a temperature and the vehicle information including two or more of a traveling distance, a traveling time, and a speed;
store at least a battery state identification model generated through machine learning of the battery information by using a neural network and training data and a vehicle state identification model generated through machine learning of the vehicle information by using a neural network and training data;
identify a state of the secondary battery by applying the battery information to the battery state identification model;
identify a state of the vehicle by applying the vehicle information to the vehicle state identification model; and
control transmission and reception of electric power between the electric power system and the secondary battery on the basis of the identified state of the secondary battery and the identified state of the vehicle.

6. A computer readable non-transitory storage medium storing a program causing a computer of a management apparatus managing transmission and reception of electric power between an electric power system and a secondary battery mounted on a vehicle to:
acquire battery information regarding the secondary battery and vehicle information regarding traveling of the vehicle from the vehicle, the battery information including two or more of a current value, a voltage value, and a temperature and the vehicle information including two or more of a traveling distance, a traveling time, and a speed;
store at least a battery state identification model generated through machine learning of the battery information by using a neural network and training data and a vehicle state identification model generated through machine learning of the vehicle information by using a neural network and training data;
identify a state of the secondary battery by applying the battery information to the battery state identification model;
identify a state of the vehicle by applying the vehicle information to the vehicle state identification model; and
control transmission and reception of electric power between the electric power system and the secondary battery on the basis of the identified state of the secondary battery and the identified state of the vehicle.

* * * * *